W. FARRELL.
NUT LOCK.
APPLICATION FILED SEPT. 10, 1921.
1,438,104.
Patented Dec. 5, 1922.
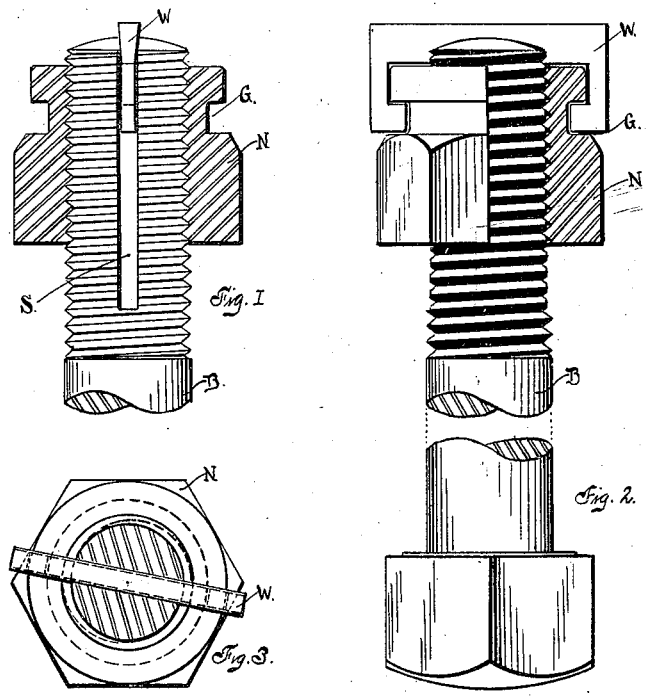
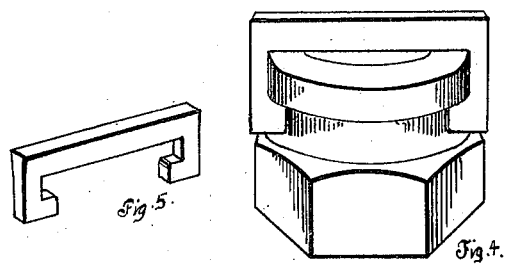
WITNESSES
INVENTOR.
William Farrell Patented Dec. 5, 1922.

1,438,104

UNITED STATES PATENT OFFICE.

WILLIAM FARRELL, OF BROOKLYN, NEW YORK.

NUT LOCK.

Application filed September 10, 1921. Serial No. 499,854.

*To all whom it may concern:*

Be it known that I, WILLIAM FARRELL, a citizen of the United States, residing at Brooklyn, county of Kings, State of New York, have invented a new and useful Improvement in Nut Locks, of which the following is a specification.

My invention relates to improvements in nut locks, in which a wedge shaped key is used to expand the bolt threads so as to bind against the nut threads and in which the key is brought to its seat by the rotation of the nut.

I have attained these objects by the mechanism illustrated in the accompanying drawing, in which—

Fig. 1 is a view partly in elevation and partly in cross section of my device in assembled relation.

Fig. 2 is a view in elevation with part of the nut cut away so as to disclose more clearly the relation of the parts.

Fig. 3 is a plan view.

Fig. 4 is a view in perspective of the key and nut, and

Fig. 5 is a view in perspective of the key.

Similar characters refer to similar parts throughout the several views. B represents a bolt with ordinary screw threads and provided with a diametrical longitudinal slot S extending from the end of the threaded end of the bolt almost through the entire threaded portion of the bolt. N is a hexagonal nut threaded to correspond with the bolt threads and is provided with a circumferential groove G upon its perimeter a short distance from the top face of the nut.

The key W is of inverted U-shape and has inturned projections upon each leg thereof which are adapted to fit into the aforementioned groove upon the nut and thereby hold the key and nut in connected relation but permitting rotative movement of one with relation to the other. The portion joining the legs of the key is wedge shaped and is adapted to lie in close proximity to the top face of the nut. This portion is adapted to fit in the bolt slot and cause the expansion of the bolt.

The operation of the device is as follows:

The nut and key are first assembled with the wedge shaped portion of the key adjacent the top face of the nut and the projections of the legs fitting in the external circumferential groove of the nut. After the bolt has been passed through the members which it is desired to secure together, the nut is threaded upon the bolt threads and the wedge shaped portion of the key after the nut has been threaded almost entirely upon the end of the bolt is guided into the slot S. Further rotation of the nut carries the key with it and forces the wedge shaped portion thereof to spread the bolt and cause a locking action between the bolt threads and the nut threads.

I claim:

In a nut lock, the combination of a bolt provided with a diametrical slot with a nut having an external circumferential groove and a key having projections adapted to enter said groove and a wedge shaped portion adapted to enter the slot in said bolt to cause a binding between the bolt and nut threads upon the screwing up of said nut upon said bolt.

In testimony whereof I have signed my name to this specification in the presence of two subscribing witnesses on this 8th day of September, A. D. 1921.

WILLIAM FARRELL.

Witnesses:
JOHN A. BRANSFIELD,
THOMAS LARKEN.